Patented Jan. 4, 1938

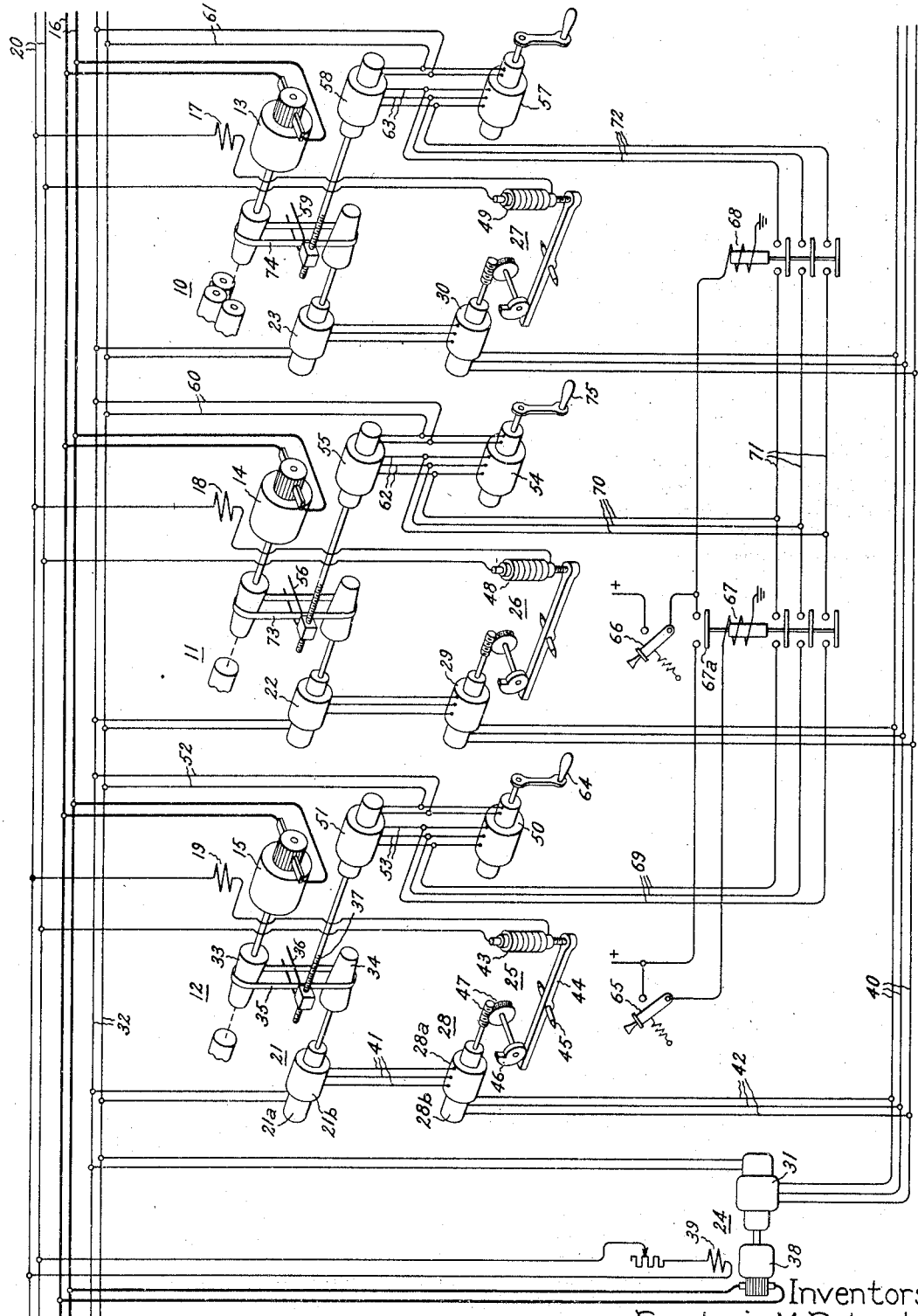

2,104,674

UNITED STATES PATENT OFFICE 2,104,674

CONTROL SYSTEM

Frederic M. Roberts, Schenectady, and Earl H. Sills, Scotia, N. Y., assignors to General Electric Company, a corporation of New York Application July 29, 1936, Serial No. 93,204

2 Claims. (Cl. 172—293)

This invention relates to control systems, more particularly to control systems for paper making machines and the like that are divided into a plurality of sections arranged in succession for operating on a strip of material. More specifically the invention relates to control systems for sectionalized machinery operating on a strip of material in which there is a certain amount of permanent stretch or draw between successive sections. On account of this draw, it is necessary that the successive sections of the machine operate at different speeds, the ratio between which must be maintained substantially constant. Occasionally, it becomes necessary to adjust the draw between sections of the machine, by adjusting the speed between sections. Obviously, if an adjustment of draw is made at one of the intermediate sections of a paper making machine, the speeds of sections which follow the section being adjusted, toward the dry end of the machine, must be correspondingly changed. The object of this progressive draw arrangement is to provide for adjusting the speed of a given section while at the same time maintaining the same speed relationship between the section being adjusted and those sections following in the direction of travel of the strip toward the dry end of the machine.

Each section of an electrical sectional drive is driven by a separate direct current electric motor, whose speed is regulated by an individual speed regulator which holds the speed of the motor substantially constant in predetermined relationship with a reference speed device. Each regulator is driven by the motor it regulates through a pair of cone pulleys connected together by a belt. In order to obtain draw or individual speed differences for each section of the machine, means are provided for shifting the belt on the cone pulleys of each regulator. This allows the motor to run at a new speed and the regulator maintains the speed substantially constant at this new value.

In carrying the invention into effect in one form thereof, electrical control circuits and electric switching mechanism are provided for shifting the position of the belt of one of the regulators thereby to vary the setting of the regulator for a selected motor of a sectionalized drive and also for varying the settings of the speed regulators for those motors following the selected motor in the direction of travel of the strip toward the dry end of the machine while leaving the settings of the regulators for the preceding motors unchanged.

For a better and more complete understanding of the invention reference should now be had to the following specification and to the accompanying drawing, the single figure of which is a simple diagrammatical illustration of an embodiment of the invention.

Referring now to the drawing, the sections 10, 11 and 12 of a sectionalized machine, such for example as a paper making machine, are respectively driven by suitable driving means illustrated as direct current electric motors 13, 14, and 15. It may be assumed that section 10 represents the drier section and that the sections 11 and 12 represent the immediately preceding press sections of the machine. Although only two press sections are illustrated in the drawing, it will be understood of course that in practice a larger number of press sections are present and that these press sections are preceded by a couch section. For the purpose of illustrating the invention, three sections are sufficient. The armatures of the direct current sectional drive motors 13, 14, and 15 are supplied from a suitable source of direct current represented by the buses 16. These buses 16 may be supplied from a suitable source such as a variable voltage generator (not shown). By varying the voltage of such generator, the speeds of all the sectional drive motors 13, 14, and 15, etc. can be simultaneously varied. Sectional drive motors 13, 14, and 15 are provided with separately excited field windings 17, 18, and 19, supplied from a separate source of excitation represented by supply lines 20. In order that the sections 10, 11 and 12 of the paper making machine may be caused to operate in predetermined speed relationship with each other, and such predetermined speed relationship maintained in spite of sudden load changes, an accurate speed regulating arrangement is provided. This speed regulating system comprises separate inductive devices 21, 22, and 23 operatively associated with the sectional drive motors 15, 14, and 13, respectively, a master set 24, separate speed regulating units 25, 26, and 27, one unit for each sectional drive motor and separate electrical differential devices 28, 29, and 30 for actuating the regulating units in response to a differential relationship between the master inductive device 31 and the separate inductive devices 21, 22, and 23 located at the various sections of the drive.

Since the separate inductive devices 21, 22, and 23 located at various sections of the drive are in all respects identical with each other, only the inductive device 21 will be described in detail.

This device comprises a rotor member 21a and a stator member 21b each provided with windings in inductive relationship with each other. The windings (not shown) on the rotor member 21a is preferably a single phase winding and is supplied from a suitable single phase source, represented in the drawing by the supply lines 32. The stator member 21b is provided with a distributed poly-circuit winding that is physically similar to a poly-phase winding. The rotor member 21a is driven at a speed that is proportional to the speed of the driving motor 15 to whose drive shaft it is connected through the variable speed device illustrated as comprising a cone pulley 33 mounted on the drive shaft of the motor 15, a cone pulley 34 mounted on the shaft of the rotor member 21a and a belt 35 connecting the cone pulleys. The position of this belt on the cone pulleys may be shifted by means of the belt shifter 36 in response to rotation of the screw 37. The inductive devices 22, 23 are in all respects identical with the device 21 and are similarly connected to the motors 14 and 13.

The master set 24 comprises the inductive device 31 provided with a single phase winding (not shown) on its rotor member, and a distributed poly-circuit winding (not shown) on its stator member in inductive relationship with the single phase winding. The single phase rotor winding is supplied from the single phase source 32 to which it is connected as illustrated. The rotor member of inductive device 31 is driven by suitable driving means illustrated as a separately excited direct current motor 38 having a field winding 39 supplied from the constant excitation source 20 and having its armature member supplied with direct current from the buses 16.

The terminals of the poly-circuit winding of the stator member of inductive device 31 are connected to the regulating buses 40. The differential device 28 comprises a stator member 28a having a distributed poly-circuit winding (not shown) whose terminals are connected to the terminals of the poly-circuit winding on the stator member 21b of inductive device 21, and a rotor member 28b likewise provided with a poly-circuit winding (not shown) which is connected to the regulating buses 40. Since the motor 38 which drives the rotor member of the inductive device 31 is supplied from the buses 16 from which the sectional drive motors 13, 14, and 15 are supplied, the speed of the motor 38 is equal or proportional to the speeds of the motors 13, 14, and 15 and also varied with the speeds of these motors in proportion when the voltage of the variable voltage bus 16 is varied to vary the speed of the drive. Consequently, the rotor member of the inductive device 31 is driven at a corresponding speed. The belt 35 of the speed regulating device associated with the sectional drive motor 15 is moved to such a position on the cone pulleys 33, 34 that the rotor member of the inductive device 21 is driven at a speed equal to the speed of the rotor member of the master inductive device 31 when the sectional drive motor 15 is rotating at the required speed. Similarly, the belts on the cone pulleys associated with the driving motors 13 and 14 are moved to positions on the cone pulleys such that the rotor members of the inductive devices 22 and 23 rotate at the same speed as the rotor member of the master inductive device 31 when the sectional driving motors 13 and 14 are rotating and driving their sections of the machine at the required speeds.

Since the rotor winding of the inductive devices 31 and 21 are connected to a source of alternating voltage, alternating voltages are induced in the stator windings of the devices 31 and 21. The voltage induced in the stator winding of the device 31 is transmitted to the regulating buses 40 and from these buses is supplied through the connections 42 to the winding on the rotor member of the differential device 28 and the voltage induced in the stator winding of the device 21 is transmitted through the connections 41 to the stator windings of the differential device 28. The voltages so transmitted to the stator winding and the rotor winding of the differential device 28 are equal and opposite when the rotor members of the induction devices 21 and 31 are in positions of correspondence and consequently no currents circulate in the connections 41, 42. Since no current flows in these connections, no torque is produced tending to turn the rotor of the differential device 28. Therefore, if the rotors of the devices 21 and 31 are initially placed in correspondence no torque tending to rotate the rotor member of the differential device 28 will be produced as long as the rotor members of the devices 21 and 31 rotate at equal speed. Similarly as long as the rotor members of the inductive devices 22 and 23 rotate in correspondence with the rotor member of the master device 31, the rotor members of the differential devices 29 and 30 remain at rest. If the speed of one of the sectional driving motors, e. g. the motor 15, increases above or decreases below the desired value which the regulator is set to hold, the rotor member of the inductive device 21 becomes out of correspondence with the rotor member of the master inductive device 31 either in a leading or a lagging sense depending upon whether the speed of the motor 15 increases or decreases. This causes the rotor member of the differential 28b of the differential device 28 to rotate in one direction or the other an amount equal to the amount by which the rotor member 21a becomes out of correspondence with the rotor member of the master device 31. Similar considerations apply to the rotor members of the differential devices 29 and 30.

Since the regulating devices 25, 26, and 27 are in all respects identical, only the device 25 will be described in detail. This device comprises a pressure responsive resistance (shown in the drawing as a carbon pile resistance 43) connected in series with the separately excited field winding 19 of the motor 15, a lever 44 movable about a fulcrum 45, and a cam member 46 which is rotated by the rotor member of the differential device 28 to whose drive shaft it is connected by suitable driving connections illustrated as worm gearing 47. When the speed of the sectional drive motor 15 decreases below the value the regulator is set to hold the rotor member of the differential device 28 rotates the cam 46 in such a direction as to release the pressure on the carbon pile resistance 43 and thereby to increase its ohmic value. This results in increasing the speed of the motor 15. Conversely, when the speed of the motor 15 rises above the desired value, the rotor member of the differential device 28 rotates the cam 46 in such a direction as to increase the pressure on the carbon pile 43 and thereby decrease its ohmic value. This strengthens the field of the motor 15 and reduces its speed. The regulators 26 and 27 include similar carbon pile resistances 48 and 49 respectively.

In order to adjust the speed of the sectional driving motors, each regulator is provided with suitable means for adjusting its setting. These means function to vary the position of the belt on the cone pulleys of the regulators and are illustrated as comprising electrical motion transmitting systems for actuating the belt shifters. The motion transmitting and receiving systems for actuating the belt shifter 36 are illustrated as comprising a transmitting device 50 and a receiving device 51 having its rotor member connected to the screw 37. Devices 50 and 51 are in all respects identical with the inductive devices 21 and 31 and a repetition of the structural details is therefore omitted. The single phase windings on the rotor members of the devices 50 and 51 are connected by means of conductors 52 to the source of single phase voltage 32, and the poly-circuit stator windings of the devices 50 and 51 are connected together by means of connections 53. A similar motion transmitting system comprising a transmitting device 54 and a receiving device 55 is associated with the sectional drive motors 14 for actuating the belt shifter 56 and similarly motion transmitting device 57 and receiving device 58 are associated with sectional drive motor 13 for actuating the belt shifter 59. The single phase windings on the rotor member of the devices 54, 55, 57 and 58 are connected to the single phase source 32 by means of connections 60 and 61. Conductors 62 serve to connect the poly-circuit stator windings of motion transmitting device 54 and motion receiving device 55 and similarly conductors 63 serve to connect the poly-circuit stator winding of transmitting device 57 and receiving device 58.

When the rotor member of the transmitting device 50 is turned, the rotor member of the receiving device 51 remains in correspondence and therefore it is turned the same amount as the rotor of the transmitter. Thus, by turning the handle 64 of the transmitting device 50, the belt shifter 36 is actuated to vary the position of the belt 35 on the cone pulleys 33 and 34. This results in changing the speed of the rotor member 21a of inductive device 21, which results in the rotor member 21a becoming out of correspondence with the rotor member of the master inductive device 31. As a result of these rotor members becoming out of correspondence the rotor member of the differential device 28 rotates and varies the resistance 43, thereby effecting a change in the speed of the motor 15 sufficient to restore the condition of correspondence between the rotor members of the devices 21 and 31. Thus, by rotating the handle 64, the setting of the speed regulating device for the sectional drive motor 15 is changed and the speed of the motor 15 itself is changed.

Assuming the sections 12 and 11 of the paper making machine to be press sections and the section 10 to be a drier section, the strip of paper will pass through the machine from left to right. The speeds of the various sections differ from each other by a slight amount on account of the stretch or draw in the strip between each section. It is necessary to maintain the speed relationship between each section and its immediately succeeding section in the direction of the travel of the strip in order not to change the draw. Consequently if the speed of any sectional motor between the wet end and the dry end is changed for the purpose of correcting the "draw", it is necessary to change the speed of all following motors a corresponding amount. In order that this may be accomplished quickly and simply, suitable selective switching mechanism is provided for connecting the transmitting device associated with the belt shifting mechanism of each speed regulating device with the receiving devices of the belt shifters associated with all remaining sections in the direction of travel of the strip. That is to say, if it is desired to change the speed of the motor 15 the selective switching mechanism provides for connecting the transmitting device 50 with the receiving devices 55 and 58. On the other hand if the speed of the motor 14 is to be changed, the selective switching mechanism must provide for connecting the transmitting device 54 with the receiving device 58 but not with the receiving device 51.

This selective switching mechanism is illustrated as comprising manually operated switches 65 and 66, etc. associated with all sections except the last section in the direction of the travel of the strip and electromagnetic switching devices 67 and 68 respectively controlled by the manually operated switching devices 65 and 66 for establishing the connections between the transmitting device of one belt shifter and the receiving devices of the following belt shifters.

Assuming that it is desired to change the speed of the motor 15 in order to correct the draw between the section 12 and the immediately preceding section (not shown) of the machine, the manually operated switch 65 is first closed. This completes an energizing circuit for the operating coil of the switching device 67 that is readily traced. The switch 67, in responding to energization, closes its main contacts to connect the transmitting device 50 to the receiving device 55 through connections 69 and 70. Simultaneously, switch 67 closes its upper interlock contacts 67a to complete an energizing circuit for the operating coil of switch 68. Switch 68 responds to energization and closes its main contacts to connect the transmitting device 50 to the receiving device 58 through connections 71 and 72. If now the handle 64 of the transmitting device 50 is rotated, the rotors of the receiving devices 51, 55 and 58 are all rotated a corresponding amount and the belts 35, 73 and 74 are displaced corresponding amounts on their cone pulley units thereby to vary the settings of the regulators 25, 26 and 27 corresponding amounts. As previously explained, the varying the setting of a regulator effects a change in the speed of the motor controlled thereby and the regulator functions to maintain the speed of the motor substantially constant at the new value. After the speed change has been effected, the switch 65 is released to interrupt the energizing circuit of the switching device 67. The switch 67 in response to deenergization opens its main contacts to disconnect the transmitting device 50 from the receiving devices and opens its interlock contact 67a to interrupt the energizing circuit for the switching device 68 which in turn opens its main contacts to interrupt the connections 71, 72.

Should it be necessary to correct the draw between the sections 12 and 11, the manually operated switching device 66 is closed to complete an energizing circuit for the operating coil of the switching device 68 which closes in response to energization to connect the transmitting device 54 through connections 71 and 72 to the receiving device 58. It will be noted that no energizing circuit is established for the switching device 67 which therefore remains in its open position. Rotation of the handle 75 now effects rotation of the rotors of the receiving devices 55 and 58 and causes the belt shifters 56 and 59 actuated thereby to change the positions of the belts 73 and 74 on their respective cone pulley units. As a result, the settings of the speed regulators 26 and 27 are varied and thereafter these speed regulators function to maintain the speeds of the driving motors 13 and 14 substantially constant at the new value. The switching device 67 remains open; the setting of the speed regulating device 25 and all preceding speed regulating devices remain unchanged.

Thus, it will be seen that by proper actuation of the selector switching mechanism, the speed of any intermediate sectional driving motor and all following motors in the direction of the travel of the strip can be changed simultaneously without varying the draw between each section of the machine and the succeeding section. It will also be noted that when the speeds of one section of the machine and the following sections are changed, the speeds of the preceding sections remain unchanged.

It will also be noted that if it should become necessary to vary the speed of any one section without varying the speed of the succeeding sections, this can be accomplished by allowing all manually operated switching devices 65 and 66 to remain open and rotating the handle of the transmitting device of the belt shifter associated with the section whose speed it is desired to change.

Although in accordance with the provisions of the patent statutes, this invention is described as embodied in concrete form, it will be understood that the apparatus and connections shown are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States, is:

1. A control system for apparatus having a plurality of successive sections each having an element for performing an operation on a length of moving material comprising an individual electric motor for driving each of said sections, an individual speed regulating device for each of said motors, each of said speed regulating devices having means for varying the speed setting thereof comprising an electrical motion transmitting device, an electrical motion receiving device, and electrical connections between each transmitting device and its associated receiving device, additional electrical connections for interconnecting the transmitting and receiving devices of each section with the transmitting and receiving devices of the other sections, and a separate control switching device associated with each of said sections and switching means controlled thereby and included in said additional connections to provide for connecting the transmitting device associated with a selected section of said apparatus to the receiving devices associated only with the succeeding sections in the direction of travel of said material whereby when the speed of the motor driving said selected section is changed the speeds of the succeeding motors in the direction of travel of the material are also changed.

2. A control system for apparatus having a succession of sections each having an element for operating on a moving length of material comprising an individual electric motor for driving each of said sections, an individual speed regulating device for each of said motors, each of said speed regulating devices having a device for varying the speed setting thereof comprising an electrical motion transmitting device, an electrical motion receiving device, and electrical connections between said transmitting and receiving devices, and selector switching mechanism for connecting the transmitting device associated with a selected section of the machine to the receiving devices associated only with the succeeding sections in the direction of travel of said material whereby when the speed of the motor for said selected section is changed the speeds of the succeeding motors in the direction of travel of the material are simultaneously changed.

FREDERIC M. ROBERTS.
EARL H. SILLS.